April 25, 1950     R. D. GARTRELL ET AL     2,505,354
MECHANICAL BELT
Filed Aug. 15, 1946
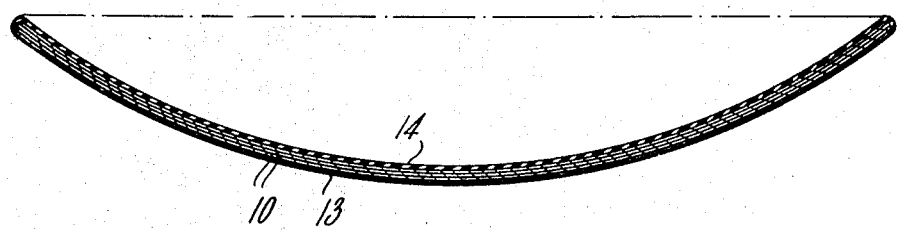
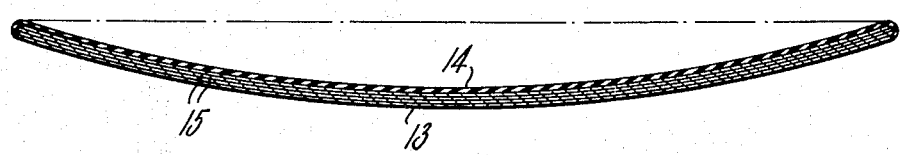
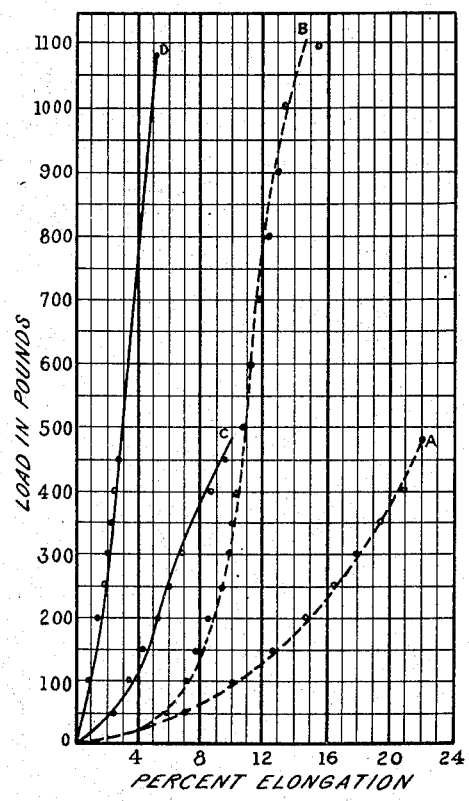
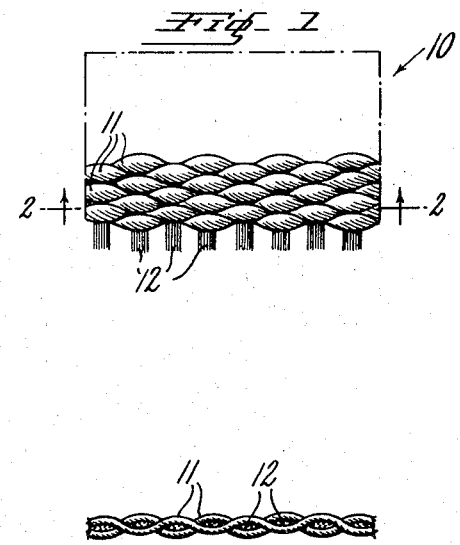
INVENTORS
ROBERT D. GARTRELL
WILLIAM D. CARROLL
ALBERT W. HANSEN
BY Charles C. Willson
ATTORNEY Patented Apr. 25, 1950

2,505,354

UNITED STATES PATENT OFFICE 2,505,354

MECHANICAL BELT

Robert D. Gartrell, Ridgewood, N. J., and William D. Carroll and Albert W. Hansen, Jackson Heights, N. Y., assignors to United States Rubber Company, New York, N. Y., a corporation of New Jersey Application August 15, 1946, Serial No. 690,773

2 Claims. (Cl. 198—193)

This invention relates to mechanical belts such as transmission belts and conveyor belts that are exceptionally strong for their weight.

Fabric belts as constructed heretofore have usually been formed of two or more plies of duck fabrics impregnated and bonded together by rubber. The reinforcing fabrics used in such belts have usually had a plain weave that serves to press the crossing yarns firmly together in the fabric. This produces a firm fabric having substantial strength longitudinally and transversely and compacts the fibers of the yarns at the crossing points to prevent fiber slippage in such yarns. Such duck fabric as used for many years in reinforcing belts had a weight up to about 30 ounces per square yard, but recently duck fabrics weighing approximately 40 ounces per square yard have been used.

As the demand for stronger belts developed manufacturers endeavored to meet such demand by increasing the weight of the duck fabric by increasing the number of reinforcing plies used in a belt, but this caused the belts to become very heavy and stiff, with the result that in heavy transmission belts considerable power was used up in bending the belt around the pulleys, and in conveyor belts a large amount of power was used to drive the long heavy stiff belts. In the field of conveyor belts a practical limit to the thickness of the belts that could be used was reached when these belts became so stiff that they would not trough sufficiently to form a good container for the coal, ore, gravel or other material to be conveyed.

In some fields of use conveyor belts are employed to carry materials from one to several miles, the materials being carried up to approximately 1,000 feet by one conveyor belt, whereupon they are deposited upon another belt. As long as the prior belt constructions above described were used it was not practical to make belts with a conveying run of much over 1,000 feet, due to the fact that the power required to drive such a belt would pull it in two or cause it to stretch many feet.

Having in mind the foregoing the present invention relates to exceptionally strong and flexible belts made for use in various fields, but the invention is primarily concerned with conveyor belts which may be made of much greater length than was practical heretofore. In other words the present invention contemplates a novel type of conveyor belt which is so constructed that the strength of the belt longitudinally for a given weight of the same is much higher than in the prior duck belts of the same weight, and the transverse flexibility of the present belt is much greater than in such prior belts.

In attempting to produce a conveyor belt of greater longitudinal strength for a given weight than the conventional multiply duck belt, applicants endeavored to do so by employing in the warp low stretch high tensile cotton yarns that had been previously treated with water containing a wetting agent and then dried under high tension, as disclosed in the Hansen et al. Patent No. 2,398,787. These treated yarns were woven in the fabric by a plain weave similar to that used heretofore in duck belt fabrics. However, the results secured when such fabric was tested for strength were disappointing, because while these chemically treated and highly stretched cotton yarns were approximately 75% stronger than the untreated cotton yarns of the same size in the conventional duck fabric, the duck fabric formed of these chemically treated yarns was not appreciably stronger than the duck fabric formed of the untreated yarn. In other words the duck fabric woven of these treated warp yarns had very poor "weaving efficiency," which is the expression used in comparing the strength of yarns before weaving with the strength of the fabric produced of such yarns. The ordinary duck fabric has relatively high weaving efficiency due to the fact that the interlocked woven yarns tend to compress the fibers of the yarn and thereby hold them from slipping one upon the other in the yarn. In the case of the chemically treated and highly stretched yarns the fibers were in a highly compacted condition in the yarn before it was woven in the fabric, therefore the interlocking action of weaving did not serve to further consolidate the fibers, and on the other hand the high crimp imparted to the warp yarns by the weave reduced the strength of such yarns and increased their stretch in the fabric.

After the unsatisfactory experience with the fabric just mentioned applicants developed the construction of the present invention in which they used in the warp the low stretch, high tensile cotton yarns described in the Hansen et al. patent, but used in the weft small, soft, strong nylon yarns that permitted the warp yarns to be laid very close together and be woven with a small amount of crimp. This fabric was found to possess very high longitudinal strength and low stretch longitudinally, both of which properties are highly desirable in a belt fabric, and the fabric was also found to be highly flexible transversely which is an important property.

The nylon weft yarns used in this construction had a very low twist so that these yarns could flatten out like a ribbon in the fabric. The use of such nylon yarns in this fabric produced the following advantages:

(1) It decreased the warp crimp which, (a) resulted in a higher weaving efficiency that gave greater strength lengthwise of the fabric, (b) reduced the stretch of the fabric warpwise, (c) permitted more warp yarn volume for the same fabric weight (to the extent the crimp is reduced), and (d) permitted more warp ends to be woven or packed in the fabric per unit width.

(2) Due to the high strength of the nylon for its weight, the weft yarn weight was reduced and the warp yarn weight correspondingly increased without increasing the fabric weight, while sufficient transverse strength in the fabric was secured.

(3) By virtue of the nylon high stretch properties, and the fact that to obtain strength equal to cotton the nylon can be made much finer in size, a substantial increase in transverse flexibility of the fabric was secured.

As a result of this construction the number of wrap yarns per inch was increased about 50% above that of the warp yarns in a duck of prior construction and corresponding weight, and this greatly increased the strength of the present fabric, and since the nylon yarns used are small and have good elastic properties the conveyor belt formed of such fabric had excellent troughing properties.

As a result of the construction of the present invention the present fabric is far superior to the duck fabrics used heretofore in the manufacture of belts, particularly since the strength features of the present fabric to which attention is above directed are largely accumulative: for example: (1) the chemically treated and highly stretched yarns used in the warp are about 75% stronger than untreated cotton yarns of the same size: (2) the small strong stretchable nylon yarns used in the weft permit a decrease in the weight of the weft and corresponding increase in the weight of the warp over prior constructions, with the result that the number of warps per inch in the present fabric is much higher than in the prior construction of corresponding weight using the same size warp yarns; (3) the slight crimp of the present warp yarns gives high strength in the woven fabric, and the low stretch of these yarns and low crimp work together to produce a fabric having very low longitudinal stretch.

As a result of these highly desirable properties of the present fabric it is possible to make a conveyor belt of much greater length than those operated heretofore to convey heavy materials, and due to the greatly increased strength of the present fabric and low stretch and high transverse flexibility more plies may be used in a belt constructed of such fabric than heretofore. This permits an increase in the thickness of the belt to secure more strength, without producing a belt that is so stiff it will not trough properly. Furthermore the present belt will stretch much less than the duck belts made heretofore, and therefore the total stretch of a very long belt made of the present fabric will not become a serious problem.

The above and other features of the present invention will be further understood from the following specification when read in connection with the accompanying drawing wherein;

Fig. 1 is a plan view of a piece of mechanical fabric constructed in accordance with the present invention.

Fig. 2 is a longitudinal sectional view through the fabric of Fig. 1, and taken on line 2—2.

Fig. 3 is a transverse sectional view through a conveyor belt constructed of the fabric of the present invention, the good troughing properties of the fabric being shown in this view.

Fig. 4 is a similar view of a conveyor belt of prior construction illustrating the poor troughing properties caused by the stiffness of the fabric in the belt; and Fig. 5 is a diagram showing stress-strain curves.

In the drawing 10 is a mechanical fabric constructed in accordance with the present invention. It has a plain weave and is formed of the warp yarns 11 and weft yarns 12. The weft yarns 12 are much smaller than the warp yarns 11 and have so little twist that they flatten out like ribbons in the weave as shown in Fig. 2, and due to the fact that these yarns are small, soft and highly flexible and are spaced from each other the amount of crimp imparted to the warp yarns 11 by the fabric weave will be comparatively small as shown in Fig. 2.

The warp yarns 11 are preferably formed of grey cotton fibers, that is fibers from which the natural waxes have not been removed. These yarns have been previously stretched and set in the stretched condition so that they may be called "pre-stretched" yarns. They preferably have been momentarily treated with an aqueous solution containing a wetting agent such for example as described in the Buckwalter Patent No. 2,297,536, and which yarns are then stretched in the wet condition and dried under high tension as disclosed and claimed in the Hansen et al. patent above cited. Yarns treated in accordance with the disclosure of these patents have a tensile improvement of about 75% but have very low stretch, as they are stretched nearly to the breaking point while wet and during the drying operation. The solution used to treat the yarns 11 should be capable of penetrating quickly into the interior of the yarn, and adapted to act upon the natural waxes of the fibers without removing such waxes as described in the Buckwalter patent. Good results have been secured by using rosin which is saponified to form an alkali rosinate which is mostly the alkali salt of abietic acid, or an alkali metal rosinate-silicate solution may be used.

The yarns 12 used in the weft are preferably high tenacity nylon yarns that are much smaller in size than the warp yarns, 210 denier yarn with 68 filaments and eight plies twisted together with 3 turns per inch is considered a good construction.

The relatively large warp yarns 11 are preferably crowded very close together in the fabric 10 as shown in Fig. 1, since the more warp yarns that are crowded in the fabric per inch the greater should be the longitudinal strength of the fabric. The weave shown is, as above stated, a plain weave having one end up and one down, and it will be noted from Fig. 1 that where a warp yarn is up it presents a somewhat elliptical appearance due to its spreading out on the flat surface of the fabric for a short distance and then is compressed where it passes through the fabric. As a result only the cotton warp yarns appear at each face of the fabric, the nylon weft yarns being confined at the interior of the fabric. This is an important feature because rubber will not adhere well to nylon yarns, but since in the present fabric only the cotton yarns appears at each face of the fabric rubber will bond well thereto.

The fabric of the present invention can be used to make a single ply belt or belts of any desired number of plies, each ply being coated with rubber or other elastomer and then bonded to the other plies.

In Fig. 3 of the drawing is shown a transverse section through a relatively wide conveyor belt formed of six plies of the fabric 10 which are impregnated with rubber or the like and then bonded together as heretofore. The entire outer surface of the belt is preferably provided with a protecting film of rubber as indicated by 13 and since the upper face of the belt which carries the load is subjected to severe wear it is provided with a thick protecting rubber layer 14.

A conveyor belt should have good troughing properties to prevent it from spilling the load, such as ore, crush rock, gravel or the like being conveyed by the belt. This means that when the belt is supported adjacent its opposite edges it will sag down in the middle under its own weight sufficiently to form a good trough as shown in Fig. 3 of the drawing.

Fig. 4 of the drawing shows a section of a prior type of conveyor belt using ordinary heavy duck fabric to form the reinforcing plies 15, which plies render the belt so stiff that it troughed very little as shown in the drawing and therefore will spill the load deposited thereupon.

The above and other properties of the fabric 10 of the present invention will be further understood from Table I which gives in column 1 the properties of a conventional cotton duck fabric and in column 2 the properties of a fabric of corresponding weights which was constructed in accordance with the present invention. Table II gives certain properties of belts made from the fabrics of Table I.

TABLE I

|  | 1 Conventional Fabric | 2 New Fabric |
|---|---|---|
| Const'n—warp | 6/11 | 7.20/10 treated cotton. |
| Const'n—weft | 6.75/6 | 210/8 nylon. |
| Warps per inch | 22 | 36. |
| Wefts per inch | 12 | 10. |
| Weight/sq./yd. fabric | 41.0 oz. | 41.0 oz. |
| Weight of warp | 33.4 oz. | 38.6 oz. |
| Weight of weft | 7.69 oz. | 2.4 oz. |
| Tensile per in.—warp [1] | 910 lbs. | 1,310 lbs. |
| Tensile per in.—weft | 275 lbs. | 275 lbs. |
| Fabric gauge (inches) | .086 | .086. |
| Fabric Elong. at break | 29.5% | 17.3%. |
| Fabric crimp—warp | 21% | 15%. |
| Fabric crimp—weft | 4.5% | 2.5%. |
| Stress-Strain of fabrics: |  |  |
| 50 lbs./inch width | 7.0% elong. | 5.9%. |
| 100 lbs./inch width | 10.0% | 7.2%. |
| 150 lbs./inch width | 12.5% | 7.9%. |

[1] Grab test.

TABLE II

*Properties of belts*

|  | Conventional | New |
|---|---|---|
| Const'n | 6 plies | 6 plies. |
| Stress-Strain: |  |  |
| 50 lbs./inch width | 2.4% elong. | 0.5%. |
| 100 lbs./inch width | 3.4 | 0.8. |
| 150 lbs./inch width | 4.2 | 1.3. |
| Break | 10.0 | 5.1. |

The fabric of column 2 of Table I has a breaking strength of more than 15,000 pounds per square inch, whereas the fabric of column 1 of this table has a breaking strength of about 10,500 pounds. The warp yarns used in this new fabric are ten ply yarns formed of single yarns having a count of 7.2's, this is equivalent to a yarn count of .72's. The size of both the warp and weft yarns may be varied extensively but the warp yarns should be coarse and the weft yarns should be much smaller.

The gauge of each fabric is given in Table I as .086", it will therefore take 11.6 plies to form a sheet one inch thick. The strength of one square inch of the conventional fabric given above as 10,500 lbs. was found by multiplying 910, the strength of one ply, by 11.6. Likewise the strength of one square inch of the new fabric given above as 15,000 was found by multiplying 1310 by 11.6.

Since the strength of the fabric used in a belt will vary extensively with its construction and gauge, it is desirable for the purpose of defining the present invention to give the strength of both the fabric and belt upon the basis of a square inch section, as this avoids the strength variation due to the gauge of a single ply.

It is well known that the actual strength of a duck belt is far below the breaking strength of a single fabric ply multiplied by the number of plies used. This is because the fabric is stretched in making up a belt which causes it to elongate, as the crimp is removed and becomes thinner, and when the fabric plies are bonded together by rubber they will not all exert 100% of their strength when the belt breaks. In fact commercial duck fabrics exert only about 60% of the total strength of the individual fabric plies at break.

Belts ranging from two to ten plies of the fabric of Table I, column 1 have been repeatedly tested for breaking strength, using the Baldwin test, and this breaking strength when placed on the square inch basis of the plies (as if the rubber layers had no thickness) gave a breaking strength of about 7,300 lbs. per square inch. The fabric in the belts tested was made of conventional strong cotton, but if premium cotton had been used in the fabric a gain of about 10% in strength should be expected, in which case the strength of the belt might have reached about 8000 lbs. per sqare inch for the best grade duck belts available heretofore.

A belt constructed of the new fabric of Table I, column 2 would have a much higher breaking strength per square inch, due not only to the superior strength of the individual fabric plies of the present invention, but also to the short elongation of the belt in use, whereby each ply will have a better chance to impart its full stretch to the belt. This will be apparent from the diagram of Fig. 5.

The comparative strength and stretch properties of the new fabric and old fabric and of the new belt and old belt are clearly shown in the stress-strain diagram of Fig. 5, wherein the percentage elongation of the fabrics and belts are plotted in the horizontal direction and the loads in pounds are plotted in the vertical direction. In this Fig. 5, the dotted line A is the stress-strain curve of a grey conventional fabric such as set forth in column 1 of the Table I; the dotted line B is the stress-strain curve of the new fabric of the present invention as set forth in column 2 of Table I; the solid line C is the stress-strain curve of a six-ply conveyor belt made of the fabric of column 1 Table I; and the solid line D is the stress-strain curve of the new belt of the present invention made of the fabric of column 2, Table I.

This diagram shows that the strength of the new fabric greatly exceeds that of the old fabric while its stretch is far below that of the old fabric. It also shows that the strength of the new belt greatly exceeds that of the old belt and that its stretch is far below that of the old belt, and Figs. 3 and 4 by comparison show the greatly improved flexing properties of the new belt.

The low stretch properties of a belt constructed of the present fabric make it practical to operate such belt under tensions that lie close to the breaking point. Furthermore the present low stretch fabric tends to make every fabric ply carry its part of the strain and thereby produce a belt having what is known as "good break" properties. The high transverse flexibility of the present fabric not only imparts good troughing properties to a thick belt, but enables the belt to absorb shocks better than stiff boardy belts.

The chemically treated warp yarns 11, and the nylon weft yarns 12 are both highly resistant to the injurious action of water, such as may be met when a conveyor belt is operated for years in a wet mine. The fabric illustrated in Fig. 1 of the drawing has a plain weave but other weaves may be used, and a further increase in the longitudinal strength of the fabric may be secured by employing a twill weave which will further reduce the crimp of the warp yarns.

Having thus described our invention, what we claim and desire to protect by Letters Patent is:

1. A multiply conveyor belt formed of a plurality of plies of woven fabric bonded together with rubber to provide a strong, low stretch belt having good troughing properties, most of the plies being formed of pre-stretched, strong and highly compacted coarse cotton warp yarns which yarns have a very low stretch capacity and lie close together in the ply, and have interwoven therewith smaller low twist weft yarns that flatten out in the fabric and are disposed in non-contacting relation with each other so as to impart only a slight crimp to the warp yarns and formed of high tenacity nylon filaments, to thereby provide a conveyor belt having a longitudinal strength that is considerably over 8,000 pounds per square inch and a longitudinal stretch of not more than about 5% at break.

2. A multiply conveyor belt formed of a plurality of plies of woven fabric bonded together with rubber to provide a strong, low stretch belt having good troughing properties, most of the plies being formed of pre-stretched, strong, coarse, cotton warp yarns that have been highly stretched in a wet condition and dried while stretched and have a very low stretch capacity and are disposed close together in the ply, and have interwoven therewith smaller low twist weft yarns that flatten out in the fabric and are disposed in non-contacting relation with each other so as to impart only a slight crimp to the warp yarns and formed of high tenacity nylon filaments, to thereby provide a conveyor belt having high longitudinal strength for its thickness and a longitudinal stretch of not more than about 5% at break.

ROBERT D. GARTRELL.
WILLIAM D. CARROLL.
ALBERT W. HANSEN.

REFERENCES CITED

The following references are of record in the file of this patent:

UNITED STATES PATENTS

| Number | Name | Date |
|---|---|---|
| 1,659,680 | Burns | Feb. 21, 1928 |
| 2,005,407 | Abrahamsen et al. | June 18, 1935 |
| 2,298,071 | Smith | Oct. 6, 1942 |
| 2,349,290 | Loughborough | May 23, 1944 |
| 2,423,828 | Chagnon | July 15, 1947 |

FOREIGN PATENTS

| Number | Country | Date |
|---|---|---|
| 574,090 | Great Britain | Dec. 20, 1945 |